Oct. 5, 1943.     R. S. BOHANNAN     2,330,797
HYDRAULIC FORCE TRANSMISSION MECHANISM
Filed July 1, 1941    2 Sheets-Sheet 1
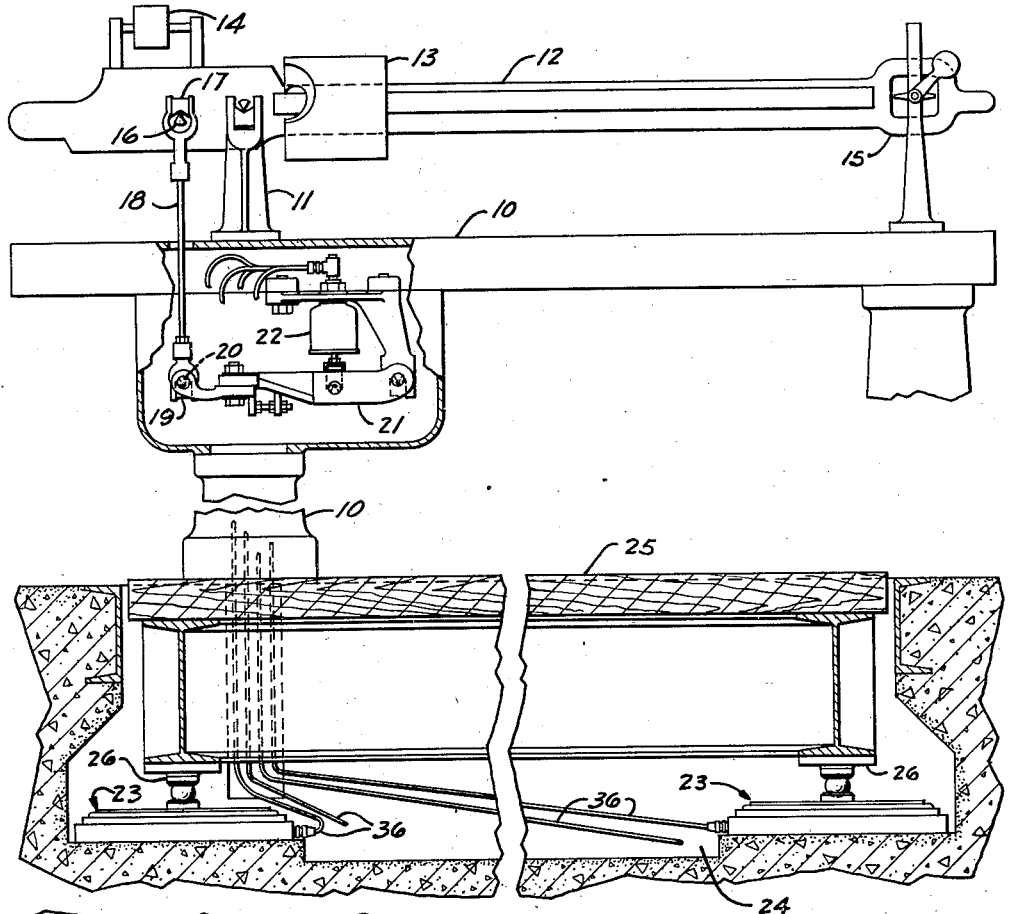
Fig. I
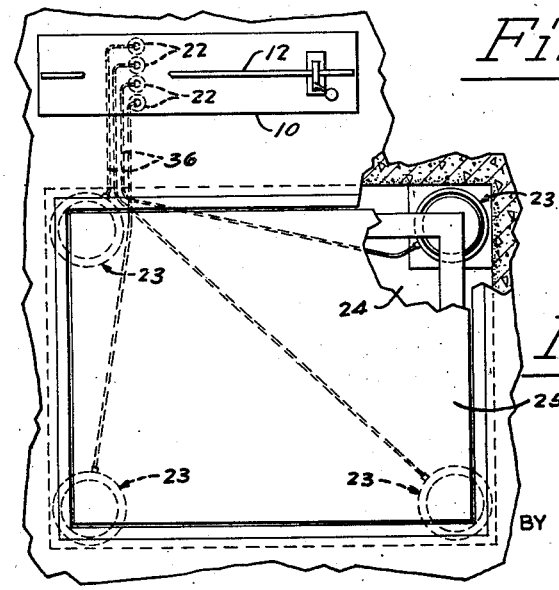
Fig. II
Robert S. Bohannan
INVENTOR
BY Marshall and Marshall
ATTORNEYS Oct. 5, 1943.                R. S. BOHANNAN                 2,330,797
            HYDRAULIC FORCE TRANSMISSION MECHANISM
                  Filed July 1, 1941           2 Sheets-Sheet 2
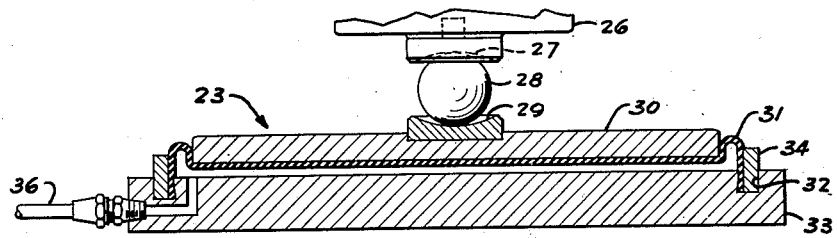
_Fig. III_
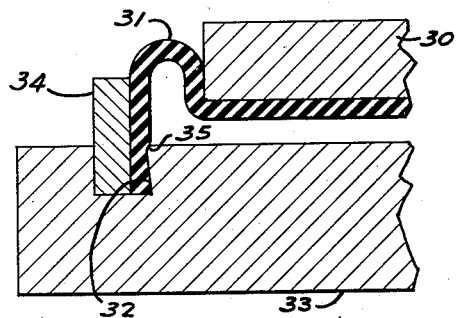
_Fig. IV_
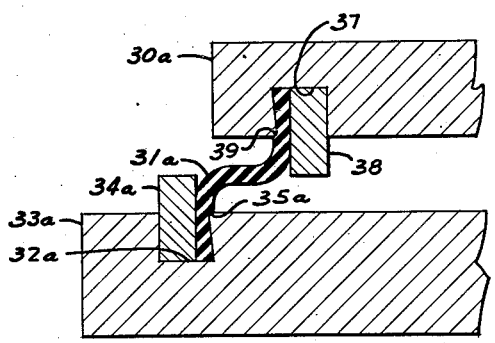
_Fig. V_
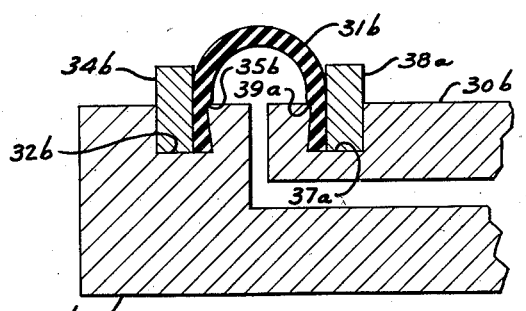
_Fig. VI_
Robert S. Bohannan
INVENTOR
BY Marshall and Marshall
ATTORNEYS Patented Oct. 5, 1943

2,330,797

UNITED STATES PATENT OFFICE 2,330,797

HYDRAULIC FORCE TRANSMISSION MECHANISM

Robert S. Bohannan, Toledo, Ohio, assignor to Toledo Scale Company, Toledo, Ohio, a corporation of New Jersey Application July 1, 1941, Serial No. 400,615

2 Claims. (Cl. 265—47)

This invention relates to weighing scales of the type in which the transmission of force from a load receiver to load counterbalancing means is accomplished through a hydraulic system, and more particularly to that portion of the hydraulic system upon which gravitational force is exerted and which converts such force into pressure.

The capsule of a hydraulic type weighing scale is a compressible chamber on which a load receiving member of the scale is supported, and which, being responsive to the force exerted by the load placed upon the scale, creates pressure in the hydraulic system which transmits such force to load counterbalancing and indicating mechanism. Since the capsule forms one end of a hydraulic system, and since it creates pressure within such system, it must both confine the liquid in the system and permit the load to be supported upon the liquid in the capsule to create the pressure therein. These functions are best accomplished by interposing a flexible wall portion between the body of the capsule and a pressure plate supporting the load receiver.

The flexible wall portion of the capsule must be tightly sealed to the pressure plate and to the body of the capsule to prevent the escape therefrom of liquid held in the capsule to support the pressure plate. One method of supplying this flexible wall portion, and of sealing it to the capsule body, has been to use a flat ring which was fastened to the capsule body by a plurality of bolts and served to clamp the flexible wall portion, often in the form of a diaphragm, to the body.

This construction has several inherent difficulties. Among them are the necessity for machining the bolt holes and sockets in the body and the ring, the difficulty of assembling the capsule, due to the large number of bolts and the necessity of tightening all the bolts to relatively the same degree of tightness.

It is an object of this invention to provide a capsule having a flexible wall portion which can be easily positioned and quickly sealed in place without the use of any bolts or nuts.

It is a further object of this invention to provide a capsule wherein a pressure plate is connected to the body of the capsule in such manner as to prevent escape of the liquid confined therein, by means of a flexible part easily and securely fastened in place and rapidly detachable.

More specific objects and advantages are apparent from the description, in which reference is had to the accompanying drawings illustrating a preferred form of scale embodying the invention.

In the drawings:

Fig. I is a view in front elevation of a scale embodying the invention, certain parts being in section and certain parts being broken away.

Fig. II is a reduced plan view of the scale illustrated in Fig. I.

Fig. III is an enlarged view in vertical section of a capsule embodying the invention.

Fig. IV is a still further enlarged fragmentary view in vertical section showing part of the capsule illustrated in Fig. III.

Fig. V is a fragmentary view in vertical section, showing part of a capsule embodying a modification of the invention.

Fig. VI is a view similar to Fig. V illustrating still another modification of the invention.

These specific drawings and the specific description that follows merely disclose and illustrate the invention and are not intended to impose limitations upon the claims.

Mechanism illustrated generally in the accompanying drawings, but which does not constitute part of the instant invention, is fully described in my copending applications Serial Nos. 222,831 and 299,832, and such mechanism, therefore, is described herein only in such detail as will suffice to make the connection of the instant invention therewith to be clearly understood.

Mounted upon a column and shelf structure 10, and being fulcrumed on a bearing held in a fulcrum stand 11, is a beam 12 having a poise 13, balance weights 14 and trig and locking loop 15. Resting on a load pivot 16 of the beam 12 is a bearing 17 held in the upper end of a vertical pull rod 18. The vertical pull rod 18 has, attached to its lower end, a clevis-held bearing 19 in which rests a nose pivot 20 of a shelf lever 21 fulcrumed on a bracket carried by the structure 10. Mounted in a bracket on the shelf structure 10 are pressure responsive chambers 22 which are each connected to a capsule 23 located in a pit 24. Within each of the pressure responsive chambers 22 is a metallic bellows (not shown) which applies force on the shelf lever 21 through a strut and bearing acting upon the load pivot of the shelf lever 21. A platform 25 is supported on the capsules 23.

The frame of the platform 25 has, mounted on the underside of each of its corners, a leg 26, in the lower end of which there is a downwardly facing concave depression 27 which rides on a ball 28 carried in an upwardly facing concave depression 29 in the upper surface of a pressure plate 30. The pressure plate 30 (Fig. III) is supported upon a flexible diaphragm 31 which is clamped in a dove-tailed annular groove 32 in a capsule body 33 by means of an annular clamping ring 34.

The flexible diaphragm 31 (Fig. IV) is wedged into the groove 32 when the clamping ring 34 is driven downwardly into the groove 32. The compression of the flexible diaphragm 31, which takes place against a shoulder 35, of the body 33, assures a liquid tight seal between the body 33 and the diaphragm 31.

The diaphragm 31 is preferably constructed of very flexible material having only a slight amount of elasticity so that pressures in the fluid confined by the diaphragm in the capsule will not distort its shape and so that it will not incorrectly influence the pressure induced in such liquid by the loads carried by the pressure plate 30 and the load receiver. As shown in the drawings, this material may be made of rubberized fabric or especially treated rubber possessing the above-listed desirable qualities.

The diaphragm 31 is adapted to confine a quantity of liquid in the space between its lower surface and the upper surface of the body 33. This space is connected to one of the pressure chambers 22 by means of a pipe 36. The body 33 may, for economy of manufacture, be in the form of a flat base plate.

The clamping ring 34 firmly holds the diaphragm 31 in place to prevent the escape of liquid from the capsule 23. The load which is placed upon the load receiver and carried by the upper pressure plates 30 of the capsules 23 is floated on the liquid which is confined within the capsules by the diaphragms 31. It is for this reason that the diaphragm must be securely sealed to the body 33 so that the liquid cannot possibly escape from the capsule, thus modifying the pressure created in the liquid by the weights of loads on the load receiver and adversely affecting the accuracy of the scale.

Fig. V illustrates a capsule embodying a modification of the invention. In this modification, a formed flexible wall member 31a is tightly clamped into a dove-tailed groove 32a in a capsule body 33a, by means of an annular clamping ring 34a. The flexible wall member 31a is in the shape of a collar and extends upwardly into a dove-tailed annular groove 37 cut in the underside of a pressure plate 30a and held therein by a clamping ring 38, its lower rim being compressed against a shoulder 35a, in the body 33a, by the ring 34a and its upper rim being compressed against a similar shoulder 39 on the pressure plate 30a.

Fig. VI illustrates another embodiment of the invention in which a flexible wall member 31b is constructed in the form of an inverted U-shaped annulus. The outer rim of the member 31b is forcibly clamped in a dove-tailed groove 32b in a body 33b by an annular clamping ring 34b and its inner rim is clamped in a dove-tailed groove 37a in a pressure plate 30b, by means of an annular clamping ring 38a. The rims of the member 31b are compressed against the shoulders 35b, on the body 33b, and 39a, on the plate 30b, by means of the rings 34b and 38a respectively, to form a seal to prevent the escape of liquid which the flexible member 31b is adapted to confine in the space between the plate 30b and the body 33b.

The embodiments of the invention that have been disclosed may be modified to meet various requirements.

Having described the invention, I claim:

1. In a weighing scale, in combination, a plurality of load supporting capsules adapted to contain liquid, each of said capsules comprising a base plate, a flexible member mounted on said base plate, a pressure plate lying above said base plate, said flexible member connecting said pressure plate to said base plate and being adapted to float upon and confine such liquid between said pressure plate and said base plate, annular grooves in said pressure plate and said base plate and removable clamping rings adapted to be forced with the edges of said flexible member into said grooves in the direction of the principal axes of said rings thereby to wedge clamp said flexible member to said pressure plate and to said base plate to prevent the escape of liquid from said capsule and to maintain said flexible member and said pressure plate in position.

2. In a weighing scale, in combination, a plurality of capsules adapted to contain liquid, each of said capsules comprising a body having an annular groove in its upper surface near its periphery, a pressure plate, a flexible member for connecting said pressure plate to said body, said flexible member extending into said annular groove in said body and a removable clamping ring for wedging said flexible member in said annular groove, said flexible member being adapted to confine liquid in said capsule.

ROBERT S. BOHANNAN.